United States Patent [19]
Hanson

[11] 4,314,548
[45] Feb. 9, 1982

[54] SOLAR COLLECTOR

[76] Inventor: David J. Hanson, New Castle, Me. 04553

[21] Appl. No.: 155,955

[22] Filed: Jun. 3, 1980

[51] Int. Cl.³ .............................................. F24J 3/02
[52] U.S. Cl. .................................. 126/429; 126/448; 126/450
[58] Field of Search .............................. 126/428–432, 126/449, 444, 445, 426, 450, 451, 448

[56] References Cited

U.S. PATENT DOCUMENTS

| | | | |
|---|---|---|---|
| 3,896,786 | 7/1975 | Clevett | 126/451 |
| 3,919,998 | 11/1975 | Parker | 126/435 |
| 4,151,830 | 5/1979 | Crombie et al. | 126/444 |
| 4,178,914 | 12/1979 | Erb | 126/449 |
| 4,226,256 | 10/1980 | Hawley | 126/450 |

FOREIGN PATENT DOCUMENTS 276788  11/1965  Australia ............................ 126/449

Primary Examiner—James C. Yeung
Attorney, Agent, or Firm—Nicholas J. Aquilino

[57] ABSTRACT

A solar energy collector formed of an inclined corrugated radiant heat absorbing panel for absorbing direct and reflected solar radiation having a plurality of air passageways formed by the convolutions of the corrugations, an air intake manifold and an air exhaust manifold connected to the passageways in said panel, an inflatable air-tight bag surrounding the collector assembly and a source of pressurized air connected to said air inlet manifold for pressurizing the system and for forcing air through the heat absorbing panel for heating the same.

2 Claims, 4 Drawing Figures

SOLAR COLLECTOR

BACKGROUND OF THE INVENTION

The present invention relates to a low cost solar collector system. With the recognized depletion of fossil fuel as an energy source and the escalating expense of this type of fuel presently available, it has become increasingly apparent that alternate sources of energy are needed for both domestic and industrial heating purposes. Solar heat has been long recognized as being potentially the greatest single source of energy heretofore not used to its full potential. The problem with present solar heating systems is that the efficiency factor is relatively low and the expense of fabricating solar collector systems high as compared to the savings it provides over the use of more conventional heat sources. Other problems which add to the expense include difficulty of installation, particularly on existing homes not specifically designed for solar heat collectors. It is often necessary for completely new roof structures and mounting installations to be formed in order to convert an existing dwelling to solar heat energy.

Most prior art solar collectors are made with heavy and expensive materials increasing the cost of the system and usually reducing the amount of solar radiation reaching the collector core, releasing the heat at a slower rate and increasing energy losses. Many prior art systems also require the use of a circulating fluid for transferring the heat from the solar collector panels to the interior of the dwellings being heated or to suitable storage areas.

The solar collector system of the present invention provides a low-cost, easily installed collector which utilizes air as the heat transfer medium. A collector can be mounted on the ground, on a wall or on a roof of any existing building. The collector provides heated air which is fed directly into the space to be heated, or it may be tied into the existing heating system within the building. The system uses a pressurized solar collector formed of an outer polyethylene inflated bag used to insulate the collector and a corrugated radiant heat collector panel. The panel may be made of plastic or metal, but preferably would be cardboard to provide a lighter, less expensive construction. A blower fan, installed within the area to be heated, blows air through suitable duct work into the collector and inflates the polyethylene bag to provide a pressurized insulated system. The air is forced through the corrugated panel air passageways where it is heated. The heated air is then returned to the interior space being heated.

The solar collector of the present invention includes mounting means which may be wood or aluminum type supports to mount the collector at an inclined position in order that it be faced toward the sun's rays.

Therefore, an object of this invention is to provide a solar collector unit which is efficient and inexpensive to purchase, install and operate.

The closest prior art known to the applicant are the patents to Steel (U.S. Pat. No. 3,018,087) relating to a heat transfer panel, the patent to Crawford (U.S. Pat. No. 3,859,980) to a solar heater, the patent to Bartos (U.S. Pat. No. 4,026,628) to a solar energy collector, the patent to Crutenair (U.S. Pat. No. 4,063,547) to a solar heater, and the patent to Borst (U.S. Pat. No. 4,090,494) to a solar collector.

The subject invention and its unique features can be best understood by referring to the following description thereof together with the accompanying drawings.

DESCRIPTION OF THE PREFERRED EMBODIMENT

Figure 1:
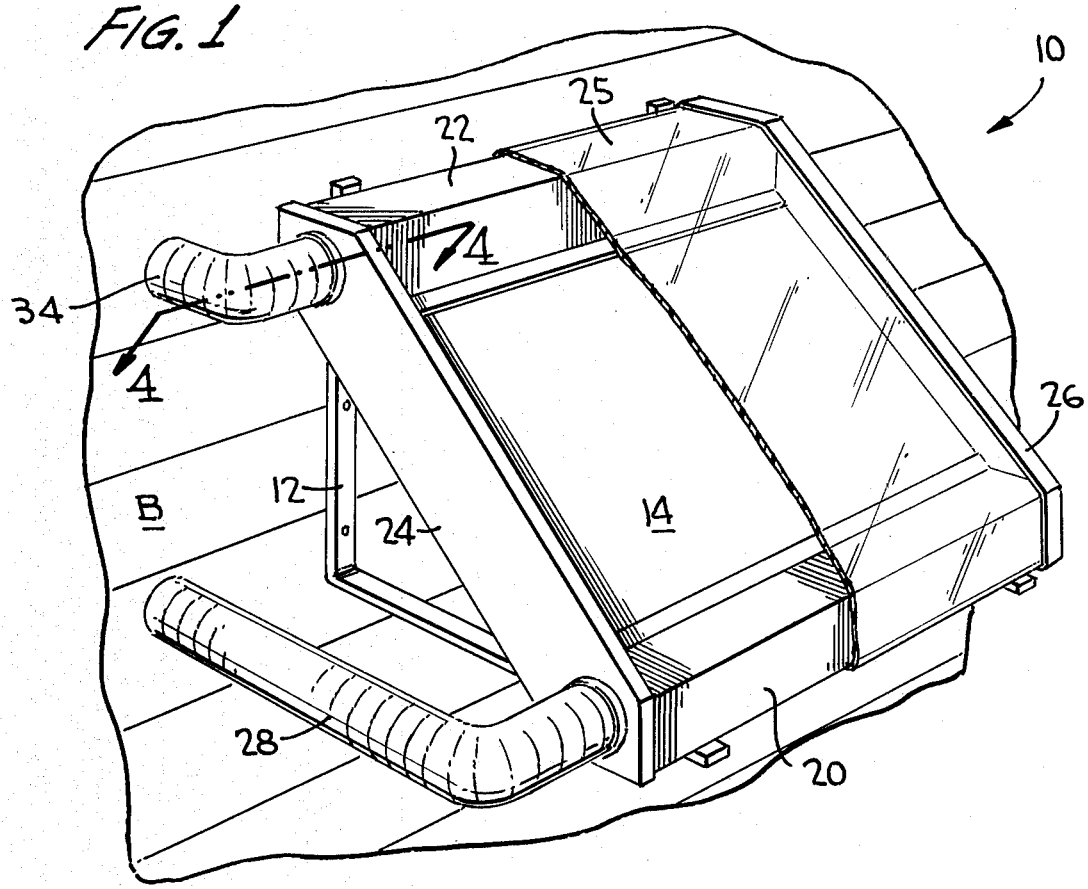
FIG. 1 is a perspective view, partly in section, of the solar collector of the present invention.

FIG. 1 illustrates a solar collector 10 embodied by the present invention mounted on a building surface B by means of suitable support brackets 12. The brackets may be attached in any conventional manner, depending upon the type of building structure and preferably would be made of wooden cleats or aluminum pipe. The support brackets 12 are generally L-shaped in configuration in order that the solar collector be mounted at an approximate 45° angle in order that it be positioned upwardly toward the sun's rays, whether it is mounted on the ground, a wall, as shown in the drawings, or on a roof structure.

Figure 3:
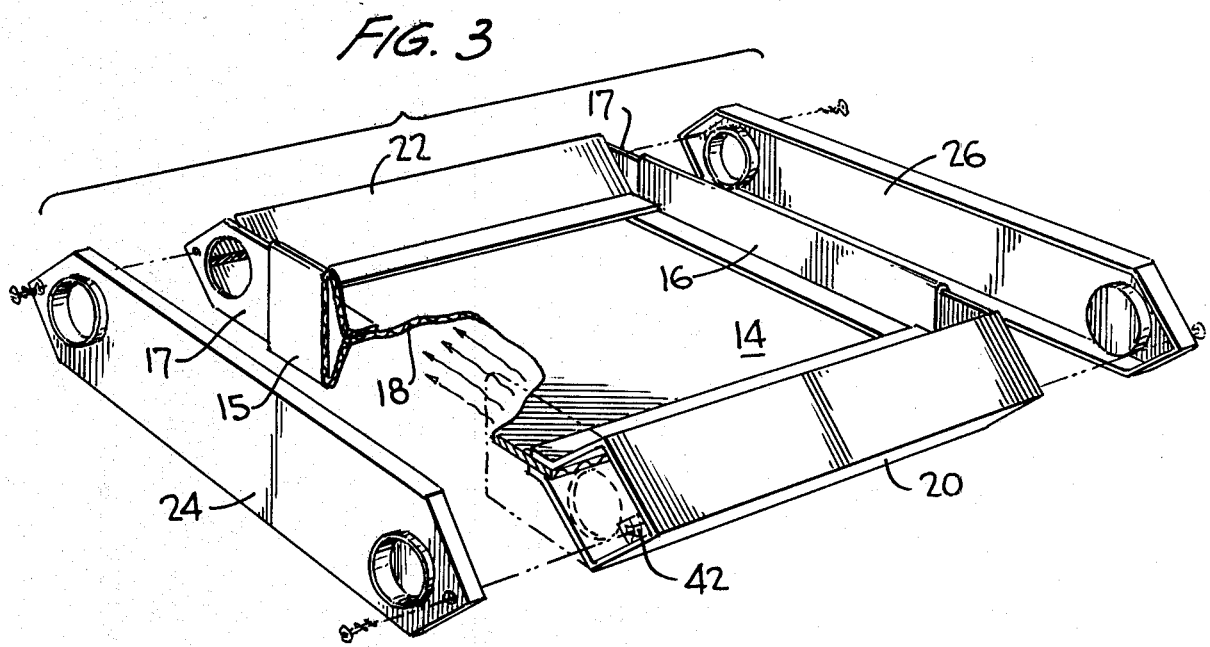
FIG. 3 is an exploded view of a part of the solar collector of FIG. 1.
Figure 4:
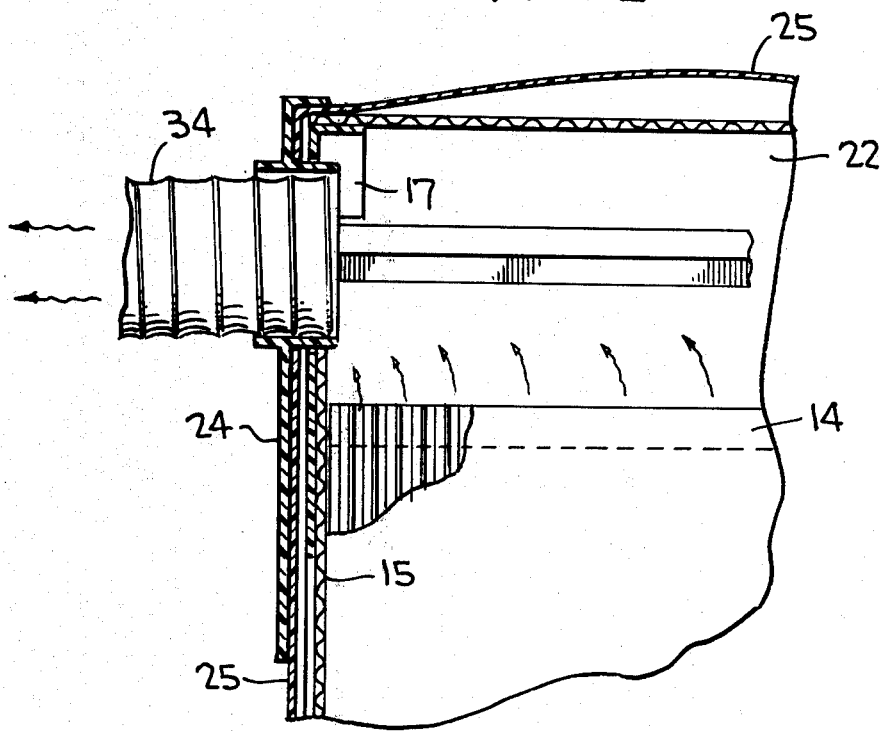
FIG. 4 is a partial, sectional view taken along lines 4—4 of FIG. 1.

The collector is formed by a heat absorbing panel 14 made of a corrugated material. End frames 15 and 16, also made of the same corrugated material, and an insert 17 are directly attached to or formed integrally with the central panel 14. The corrugated material is preferably 275-lb. corrugated cardboard which would be painted black for maximum heat transfer although suitable metal or plastic corrugated materials are equally efficient. As shown in detail in FIGS. 3 and 4, the corrugations in the panel 14 provide a plurality of air passageways 18 through which the air is circulated as described hereinbelow.

The air passageways 18 of the panel 14 are in fluid communication with a lower manifold 20 which serves as an air inlet and an upper manifold 22 which serves as an air exhaust. End cap sections 24 and 26 are suitably connected to the manifolds 20 and 22 and to the frame ends 15 and 16 to close the fluid flow path. An outer polyethylene bag 25 is wrapped completely around the heat absorbing panel 14 and is secured between the frame ends 15 and 16 and the end cap sections 24 and 26 as shown in detail in FIG. 4.

Figure 2:
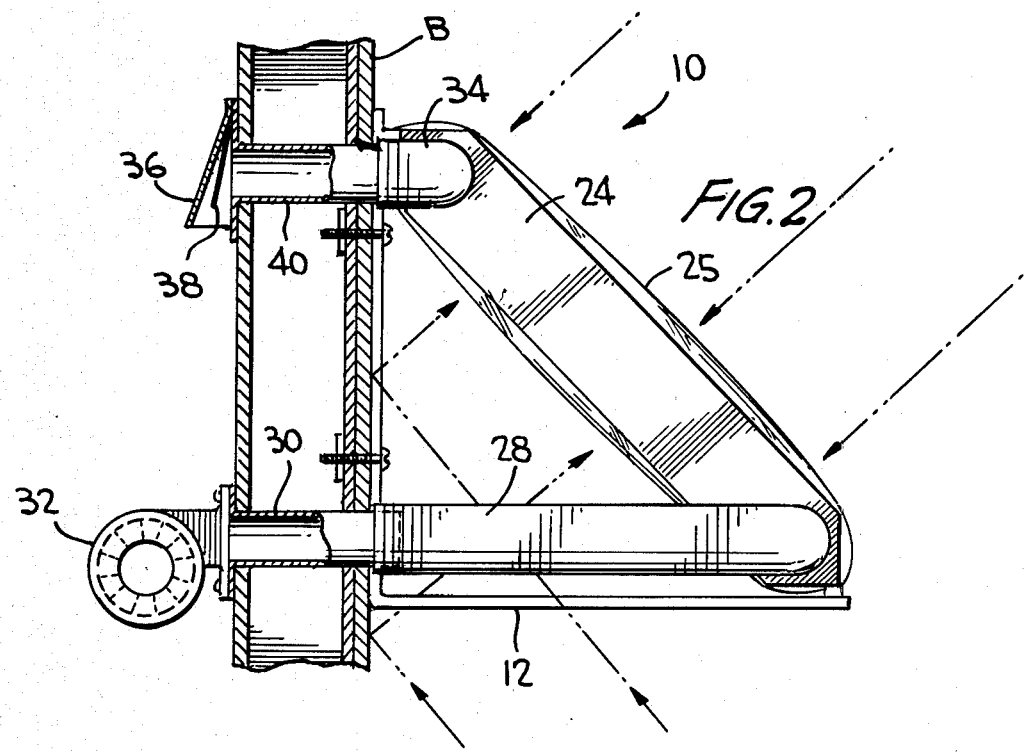
FIG. 2 is a side view partly in section of the solar collector as it is installed on a building.

The air inlet manifold 20 is connected by a flexible duct 28 and a rigid duct 30 positioned in the wall of the building B into the interior of the building B to a fan 32, as best seen with reference to FIG. 2 of the drawings. The air exhaust manifold 22 is similarly connected by means of a flexible duct 34 to the interior of the building using a vent structure of the type commercially available as a dryer vent kit including a cover 36, hinge flap 38, and duct pipe 40.

The intake and exhaust manifolds 20 and 22 are also formed of a corrugated material into a generally rectangular tube, and secured to the outside of the air passageway panel 16. Each of the manifold members 20 and 22 includes a reinforcing brace 42 which maintains the shape of the manifold units and also which provides a means for securing the end covers 24 and 26 to the manifold sections 20 and 22 using suitable fasteners.

The polyethylene bag 25 which surrounds the interior portions of the structure is made air-tight. When the fan 32 is on, the bag 25 is inflated and the interior of the solar collector is pressurized by the airflow therein. The inflation of the polyethylene bag insulates the solar collector for more effective heat transfer.

The solar collector operates as follows. When the fan 32 is turned on, air from the interior of the building being heated is forced through the ducts 28 and 30 into the air intake manifold 20. This intake air also is sufficient to inflate the polyethylene bag 25 in order to pressurize the system due to the leakage around the interior components of the collector. The air is then forced through the air distributing passageways 18 and is heated therein by the warm surface of the panel 14 which is exposed to and absorbs heat from the direct rays of the sun and from reflected radiation from wall or ground surfaces. The heated air then accumulates in the exhaust manifold 22 and is dissipated out of the exhaust duct 34 into the interior of the building being heated.

The collector is a day-time solar radiation collector and cools when not in the direct sun; however, during sunlight periods, an efficient, extremely inexpensive solar collector is provided.

It will be appreciated that many modifications may be made to the present invention without departing from the scope of the appended claims.

What is claimed is:

1. A pressurized and inflatable solar energy collector comprising a radiating heat absorbing panel assembly formed of a central panel of a plurality of longitudinally disposed air passageways and end frames integral with said central panel formed perpendicular to said central panel, first and second manifold sections in fluid communication with said air passageways, end cap sections adapted to fit over said first and second manifold sections and said end frames, at least one of said end cap sections including an air inlet and air outlet port, an air inlet duct connected to said air inlet port in fluid communication with said first manifold section, an air exhaust duct connected to said air outlet port in fluid communication with said second manifold section, an inflatable air-tight bag forming the outer layer of said collector and a source of pressurized air connected to said air inlet duct for inflating said bag and pressurizing said assembly and providing air flow between said air inlet ducts, said first manifold section, said air passageways, said second manifold section, and said outlet duct.

2. The collector of claim 1 wherein said manifold sections are rectangular and include reinforcing means to maintain said manifolds in the desired configuration.

* * * * *